United States Patent
Gallagher et al.

(10) Patent No.: US 9,906,754 B2
(45) Date of Patent: Feb. 27, 2018

(54) CHANNEL BONDING FOR ULTRA-HIGH DEFINITION VIDEO BACKGROUND

(71) Applicant: MaxLinear, Inc., Carlsbad, CA (US)

(72) Inventors: Timothy Gallagher, Encinitas, CA (US); Glenn Delucio, San Diego, CA (US); Brijesh Sirpatil, San Marcos, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 150 days.

(21) Appl. No.: 14/586,150

(22) Filed: Dec. 30, 2014

(65) Prior Publication Data

US 2015/0189224 A1     Jul. 2, 2015

Related U.S. Application Data

(60) Provisional application No. 61/921,774, filed on Dec. 30, 2013.

(51) Int. Cl.

| | |
|---|---|
| *H04N 7/015* | (2006.01) |
| *H04N 21/236* | (2011.01) |
| *H04N 21/434* | (2011.01) |
| *H04N 21/845* | (2011.01) |
| *H04N 21/63* | (2011.01) |

(52) U.S. Cl.
CPC ........... *H04N 7/015* (2013.01); *H04N 21/236* (2013.01); *H04N 21/434* (2013.01); *H04N 21/631* (2013.01); *H04N 21/845* (2013.01)

(58) Field of Classification Search
CPC .. H04N 21/236; H04N 21/434; H04N 21/631; H04N 21/845; H04N 7/015

USPC .................................................... 375/240.02
See application file for complete search history.

(56) References Cited

U.S. PATENT DOCUMENTS

| | | | |
|---|---|---|---|
| 6,674,796 B1 * | 1/2004 | Haskell ............ | H04N 21/23418 348/385.1 |
| 7,110,457 B1 * | 9/2006 | Chen ...................... | H04H 20/33 375/240.25 |
| 9,357,276 B2 * | 5/2016 | Fujita .................. | H04L 65/4076 |

(Continued)

*Primary Examiner* — William C Vaughn, Jr.
*Assistant Examiner* — Jae N Noh
(74) *Attorney, Agent, or Firm* — McAndrews, Held & Malloy, Ltd.

(57) ABSTRACT

Systems and methods are provided for communication ultra-high definition (UHD) video. At the transmitter-side, a single packet stream may be generated based on a plurality of UHD video streams; and the single packet stream may be split into a plurality of sub-streams, with each sub-steam comprising at least one or more packets from the single packet stream. The plurality of sub-streams may be pro-cesses concurrently via a plurality of transmit paths, to generate a corresponding plurality of signals for transmis-sion over a particular physical medium. At the receiver-side, the plurality of signals may be concurrently received and processed, via a plurality of receive paths, and the plurality of sub-streams may be reconstructed based on processing of the plurality signals. The plurality of sub-streams may be combined to re-generate the single packet stream; and the plurality of encoded UHD video streams may then be extracted from the single packet steam.

20 Claims, 4 Drawing Sheets

(56) References Cited

U.S. PATENT DOCUMENTS

2011/0154425 A1* 6/2011 Kim .................. H04N 21/2385
                 725/116
2015/0003439 A1* 1/2015 Mitchell ............... H04L 5/0042
                 370/343

* cited by examiner

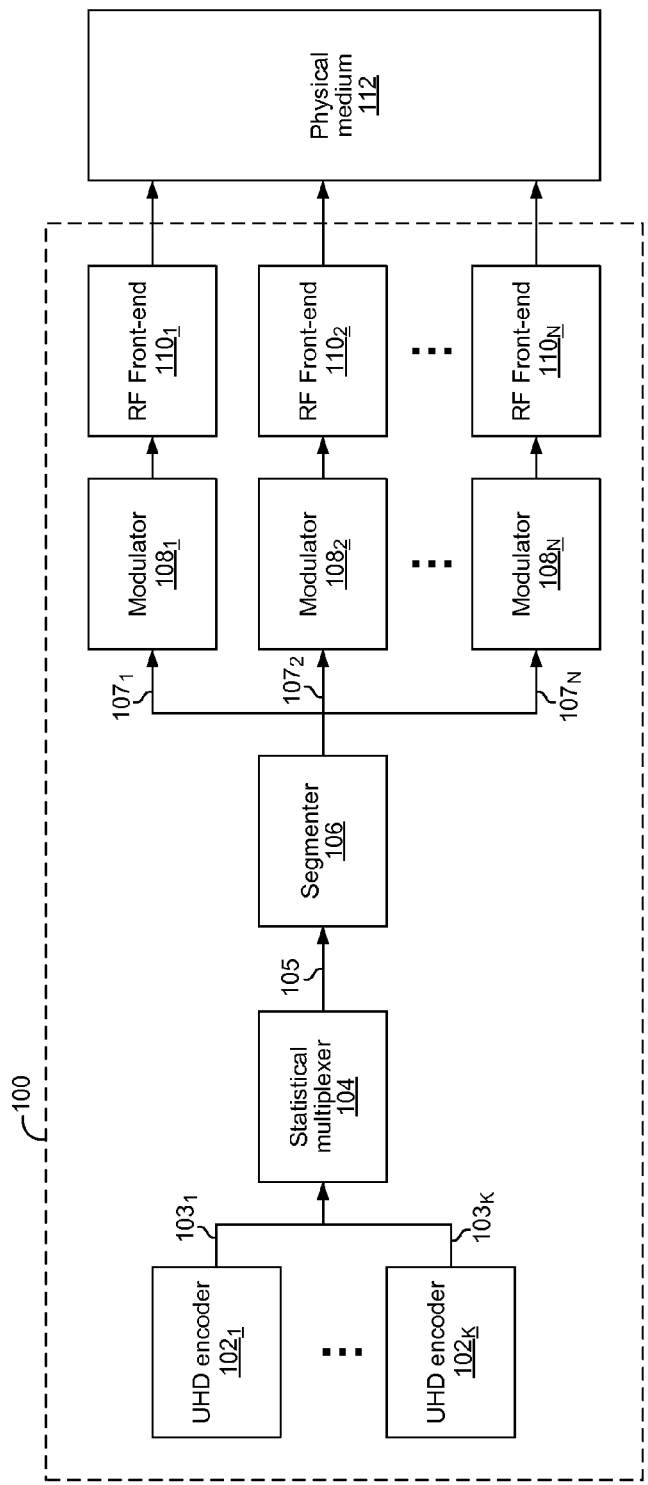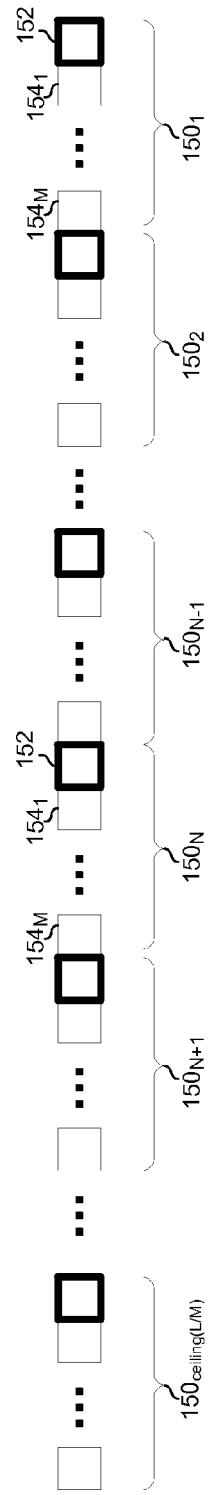
FIG. 1A
FIG. 1B

US 9,906,754 B2

CHANNEL BONDING FOR ULTRA-HIGH DEFINITION VIDEO BACKGROUND

CLAIM OF PRIORITY

This patent application makes reference to, claims priority to and claims benefit from the U.S. Provisional Patent Application Ser. No. 61/921,774, filed Dec. 30, 2013. The above identified application is hereby incorporated herein by reference in its entirety.

TECHNICAL FIELD

Aspects of the present disclosure relate to communications and video processing. More specifically, certain implementations of the present disclosure relate to methods and systems for channel bonding for ultra-high definition video background.

BACKGROUND

Conventional approaches to media transmission and/or reception may be inefficient for, or incapable of handling ultra-high definition video. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for channel bonding for ultra-high definition video background, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 1A depicts an example channel bonding transmitter for ultra-high definition video.

FIG. 1B depicts chunks of MPEG packets generated in a channel bonding transmitter for ultra-high definition video.

DETAILED DESCRIPTION OF THE INVENTION

Figure 2:
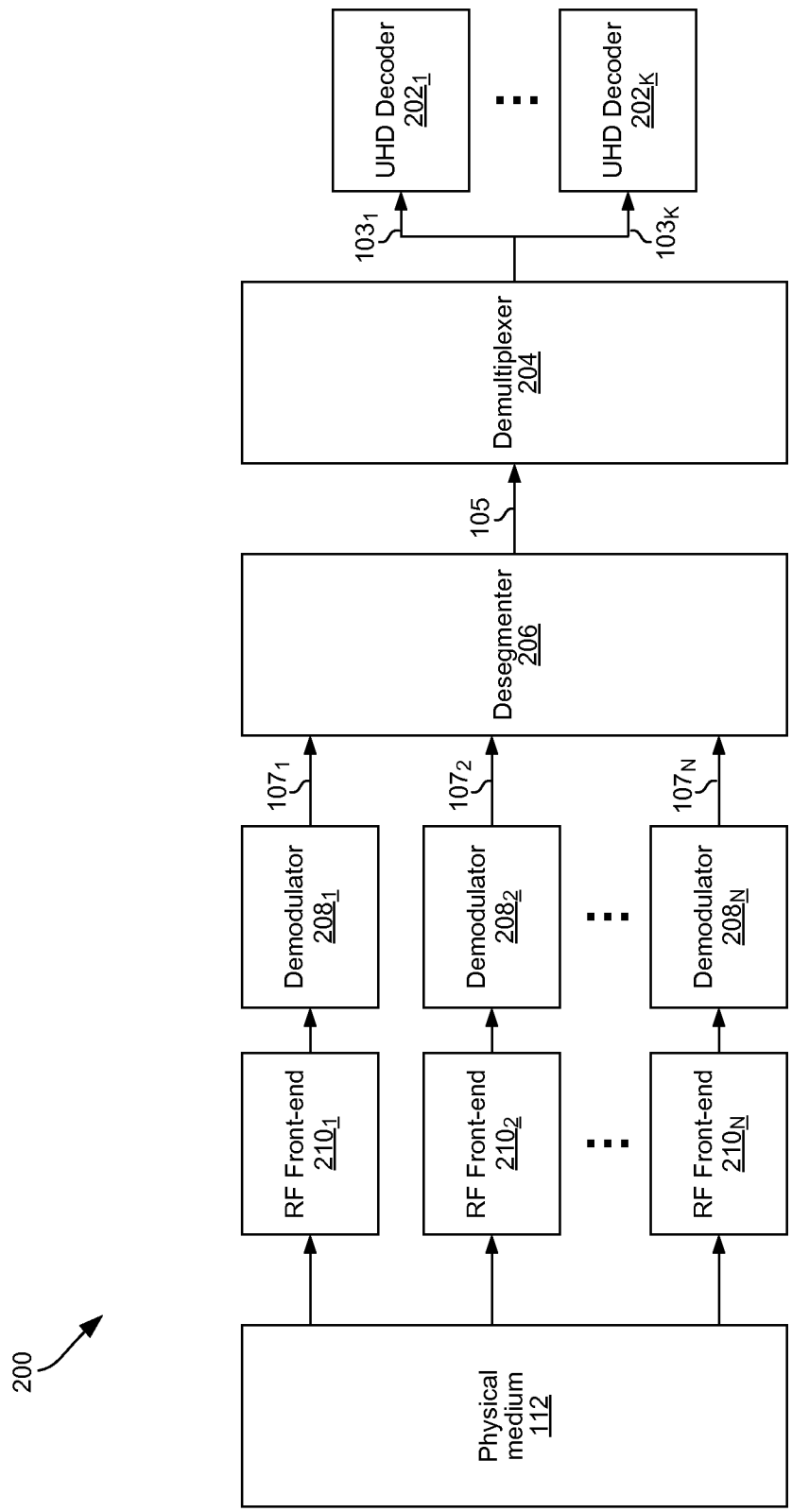
FIG. 2 depicts an example receiver configured for receiving transmissions from a channel bonding transmitter for ultra-high definition video.

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

FIG. 1A depicts an example channel bonding transmitter for ultra-high definition video. Shown in FIG. 1A is a transmitter 100.

The transmitter 100 may comprise suitable circuitry for transmitting video, particularly comprising ultra-high definition (UHD) video. For example, as shown in the example implementation depicted in FIG. 1A, the transmitter 100 may comprise K (an integer greater than or equal to 1) ultra-high definition video encoder circuits $102_1$-$102_K$, a statistical multiplexer circuit 104, a segmenting circuit 106, N (an integer greater than or equal to 2) modulator circuits $108_1$-$108_N$, and N analog/RF front-end circuits $110_1$-$110_N$.

Each of the ultra-high definition video encoder circuits $102_1$-$102_K$ may be operable to generate a corresponding encoded ultra-high definition video stream ($103_1$-$103_K$). For example, the ultra-high definition video encoder circuits $102_1$-$102_K$ may generate a plurality of MPEG streams carrying ultra-high definition (UHD) video.

The statistical multiplexer circuit 104 may be operable to multiplex a plurality of outputs (e.g., MPEG streams) onto a single stream (e.g., a packet stream 105). In this regard, the packet stream may be generated such that it has a constant bit rate.

The segmenting circuit 106 may be operable to split a single input stream into a corresponding plurality (e.g. N) of sub-streams (sub-streams $107_1$-$107_N$, in the example implementation shown in FIG. 1A).

Each of the modulator circuits $108_1$-$108_N$ may be operable to perform necessary processing, particularly modulation, on a corresponding input (e.g., one of the sub-streams $107_1$-$107_N$), to enable generating data that is suitable for incorporating into analog/RF carrier signals.

The analog/RF front-end circuits $110_1$-$110_N$ may be operable transmit an analog/RF signals, corresponding to the sub-streams, onto a physical medium 112 (e.g., air, wires, and/or optical fibers). In this regard, each analog/RF front-end circuit $110_i$ may be operable to process a signal for transmission via a respective channel of the physical medium 112. The processing may comprise, for example, amplifying, filtering, digital-to-analog conversion, etc.

In operation, the ultra-high definition video encoder circuits $102_1$-$102_K$ generate a plurality of outputs ($103_1$-$103_K$), comprising encoded ultra-high definition video, which may be input into the statistical multiplexer circuit 104. The statistical multiplexer circuit 104 may multiplex the outputs of the encoder circuits $102_1$-$102_K$ (that is the outputs $103_1$-$103_K$) with a goal of generating the packet stream 105 have a constant bit rate. In some instances, to achieve a constant bit rate, or because achieving a constant bit rate may not be feasible at the time, the statistical multiplexer circuit 104 may insert null (empty) packets into the packet stream 105. The packet stream 105 may be input into the segmenting circuit 106, which may split the packet stream 105 into the corresponding N sub-streams $107_1$-$107_N$. The packet stream 105 may be split in this manner because the bit rate of the packet stream 105 may be too high for a single modulator circuit $108_i$ and/or a single analog/RF front-end circuit $110_i$ to handle.

The splitting of the packet stream 105 into sub-streams $107_1$-$107_N$ performed by segmenting circuit 106 may comprise, for example, grouping every M*N MPEG packets of packet stream 105 into N chunks of M (a variable number) MPEG packets each. Further, to aid the receiver in reconstructing the stream 105 from the sub-streams $107_1$-$107_N$, the segmenting circuit 106 may append a chunk header to each of the chunks. The chunk header may include, for example, a sequence number and/or a time stamp.

Each of the sub-streams $107_1$-$107_N$ may be input to a corresponding one of the modulator circuits $108_1$-$108_N$, which may perform the necessary modulation (and/or any additional processing that may needed), to generate data that may be incorporated (via a corresponding one of the analog/RF front-end circuits $110_1$-$110_N$) into a carrier analog/RF signal. The resultant analog/RF signals may then be transmitted into the physical medium 112.

FIG. 1B depicts chunks of MPEG packets generated in a channel bonding transmitter for ultra-high definition video. Shown in FIG. 1B is an example structure of the packet stream 105 generated during a particular example use scenario of the transmitter 100 shown in FIG. 1A. Shown in FIG. 1B is a number (e.g., L) packets of the packet stream 105 which has been split into a number of chunks—e.g., into chunks $150_1$ to $150_{ceiling(L/M)}$. Each chunk $150_x$ may comprise M packets 154 and a chunk header 152. Thus, each chunk $150_x$ ($1 \leq x \leq ceiling(L/M)$) may be conveyed to modulator circuit $108_{xmodN}$.

Typically, where a receiver is not able to recover the header for a particular chunk of packets, all packets of the chunk may be lost. However, generating packet streams in accordance with the present disclosure (e.g., the packet stream 105), guards against such loss of packets.

In an example implementation, if a chunk $150_x$ sent on sub-stream $107_{xmodN}$ has one or more null packets, the segmenting circuit 106 and/or the corresponding modulator circuit $108_i$ may repeat some or all of the chunk header 152 of the chunk $150_x$ in the null packet(s) of chunk $150_x$.

In an example implementation, if chunk $150_x$ sent on sub-stream $107_{xmodN}$ has one or more null packets, the segmenting circuit 106 and/or the corresponding modulator circuit $108_i$ may repeat some or all of the chunk header 152 of one or more other chunks 150, (y≠x) in the null packet(s) of chunk $150_x$.

In an example implementation, performance monitoring may be used to enhance transmission reliability (e.g., guarding against loss of packets). For example, relative performance of the modulator circuits $108_1$-$108_N$, the analog/RF front-end circuits $110_1$-$110_N$, and/or channels onto which the analog/RF front-end circuits $110_1$-$110_N$ transmit may be monitored. Based on such monitoring, it may be determined which chunks are most likely to suffer loss of their chunk header in route to a receiver. Based on such determination, a chunk header that is relatively more likely to be lost in transit may be repeated in one or more other sub-streams in which the information is less likely to be lost.

In accordance with various example implementations, circuitry of a transmitter (e.g., circuitry of the transmitter 100, as described with respect to FIG. 1A, for example) may receive, in parallel, a plurality of chunks a packet stream, and may be operable to process the chunks in a manner that may enable enhancing transmission (e.g., reliability thereof). The processing may comprise, e.g., extracting from one or more chunks information related thereto, identifying possible suitable packets in one or more chunks for insertion of information, and insertions of information relating to one or more chunks, such as to enhance transmission reliability. Further, buffering may be used during such processing, such as when some chunks are received subsequent to others.

For example, in accordance with an example implementation, the circuitry may receive a first chunk and a second chunk of a packet stream, where the first chunk may comprise a first chunk header and the second chunk may comprise a second chunk header. The circuitry may be operable to detect a first null packet in the first chunk, and insert information from the first chunk header in the detected first null packet. Further, in some instances, information from the second chunk header may also be inserted in the detected first null packet (e.g., to enable using the second chunk in obtaining information at the receiver-side). The circuitry may also detect a second null packet in the second chunk, and may insert information from the first chunk header in the detected second null packet. Further, in some instances, information from the second chunk header may also be inserted in the detected second null packet.

Hence, the transmission reliability may be enhanced by insertion information (e.g., when needed). For example, the circuitry may determine that packets of the first chunk are more likely to be lost than packets of the second chunk. In response to the determination, the circuitry may extract information from the first chunk header, and may insert that information into the second chunk (e.g., in the second null packet). Similarly, where the circuitry may determine that packets of the second chunk are more likely to be lost than packets of the first chunk, the circuitry may, in response to that determination, extract information from the second chunk header, and may insert that information into the first chunk (e.g., in the first null packet).

In some instances, additional chunks may be received in parallel, and may also be used. For example, in accordance with an example implementation, the circuitry may receive a third chunk of the packet stream in parallel with the first chunk and the second chunk. The third chunk may then be handled and/or used—e.g., the circuitry may insert information from the second chunk header and the third chunk header into the first null packet.

In some instances, additional chunks may be received subsequently (after current chunks have been received and handled). Hence, already received chunks (e.g., the first and second chunks) may be buffered, such as to enable processing (and using) the additional chunk(s) in enhancing transmission (e.g., transmission thereof). For example, the circuitry may buffer the first chunk and the second chunk, until a third chunk (e.g., sent via the same channel as the first chunk or via the same channel as the second chunk) is subsequently received. In an alternative scenario, the circuitry may buffer the first chunk and the second chunk until the circuitry receive, subsequent to receiving the first chunk and second chunk, receive, in parallel, a third chunk and a fourth chunk of the packet stream, the third chunk comprising a third chunk header and the fourth chunk comprising a fourth chunk header. The circuitry may then insert information from the third chunk header into the first null packet. The circuitry may insert the fourth chunk header into the second null packet.

FIG. 2 depicts an example receiver configured for receiving transmissions from a channel bonding transmitter for ultra-high definition video. Shown in FIG. 2 is a receiver 200.

The receiver 200 may comprise suitable circuitry for receiving video, particularly comprising ultra-high definition (UHD) video. For example, as shown in the example implementation depicted in FIG. 2, the receiver 200 may comprise K (an integer greater than or equal to 1) ultra-high definition video decoder circuits $202_1$-$202_K$, a demultiplexer circuit 204, a desegmenting circuit 206, N (an integer greater than or equal to 2) demodulator circuits $208_1$-$208_N$, and N analog/RF front-end circuits $210_1$-$210_N$.

Each of the analog/RF front-end circuits $210_1$-$210_N$ may be operable to receive a signal (e.g., via a respective channel of the physical medium 112) and to process the signal. The processing may comprise, for example, amplifying, filtering, analog-to-digital conversion, etc.

Each of the demodulator circuits $208_1$-$208_N$ may be operable to demodulate its input, generating a corresponding one of a plurality outputs, which may correspond to a plurality of sub-streams (e.g., sub-stream $107_1$-$107_N$) generated and used at the transmitter-side.

The desegmenting circuit 206 may be operable to (re) generate a single stream from a corresponding plurality (e.g., N) of sub-streams (sub-streams $107_1$-$107_N$).

The demultiplexer circuit 204 may be operable to demultiplex a single stream (e.g., a packet stream 105) into a plurality (e.g., K) of outputs. In this regard, each of the outputs may comprise encoded ultra-high definition video.

Each of the ultra-high definition video decoder circuits $202_1$-$202_K$ may be operable to decode an encoded ultra-high definition video input (e.g., one of the $103_1$-$103_K$ streams), thus allowing for extraction of the original ultra-high definition video.

In operation, the receiver 200 may be operable to receive and process signals that carry encoded ultra-high definition (UHD) video, particularly signals that have been generated and transmitted by an transmitter implemented in accordance with the present disclosure (e.g., the transmitter 100 of FIG. 1A). For example, during example use scenarios, each analog/RF front-end circuit $210_i$ may be operable to process (e.g., amplifies, filters, performs analog-to-digital conversion on, etc.) a signal received via a respective channel of the physical medium 112 and output the processed signal to a corresponding demodulator circuit $208_i$. The corresponding demodulator circuit $208_i$ may demodulate its input, thus generating the corresponding sub-stream (e.g., sub-stream $107_i$). Next, the desegmenting circuit 206, using the chunk header information (found in the chunk headers 152 themselves and/or repeated in null packets, for example) may merge the sub-streams (e.g., sub-streams $107_1$-$107_N$) back into a single packet stream (e.g., the packet stream 105). The demultiplexer circuit 204 may then demultiplex the packets of the single stream, thus generating ((re)obtaining) a plurality of encoded streams which may be conveyed to the ultra-high definition video decoder circuits $202_1$-$202_K$, for decoding each of the encoded streams.

In some instances, the implementation and/or operation of the receiver 200 may be configured based on the implementation and/or operation of the transmitter from which the received video originates. For example, the receiver 200 may be configured to utilize and/or rely on measures used at the transmitter-side to guard against loss of packets.

In an example implementation, where the chunk header 152 of received chunk $150_x$ has been lost or corrupted, the demodulator $208_{xmodN}$ and/or the desegmenting circuit 206 may be operable to recover the lost header by extracting the information from a null packet of the chunk $150_x$ and/or a null packet of a chunk $150_y$ (y≠x), where $150_y$ may be received before $150_x$, after $150_x$, or in parallel with $150_x$ via a front-end $210_{ymodN}$ and demodulator $208_{ymodN}$ (ymodN≠xmodN).

In an example implementation where lost header information of chunk $150_x$ has not been inserted into any null packet or otherwise retransmitted, aspects of this disclosure may enable the receiver 200 to deduce information of the lost header based on header information of one or more chunk headers of chunks received before, after, and/or in parallel with chunk $150_x$.

Figure 3:
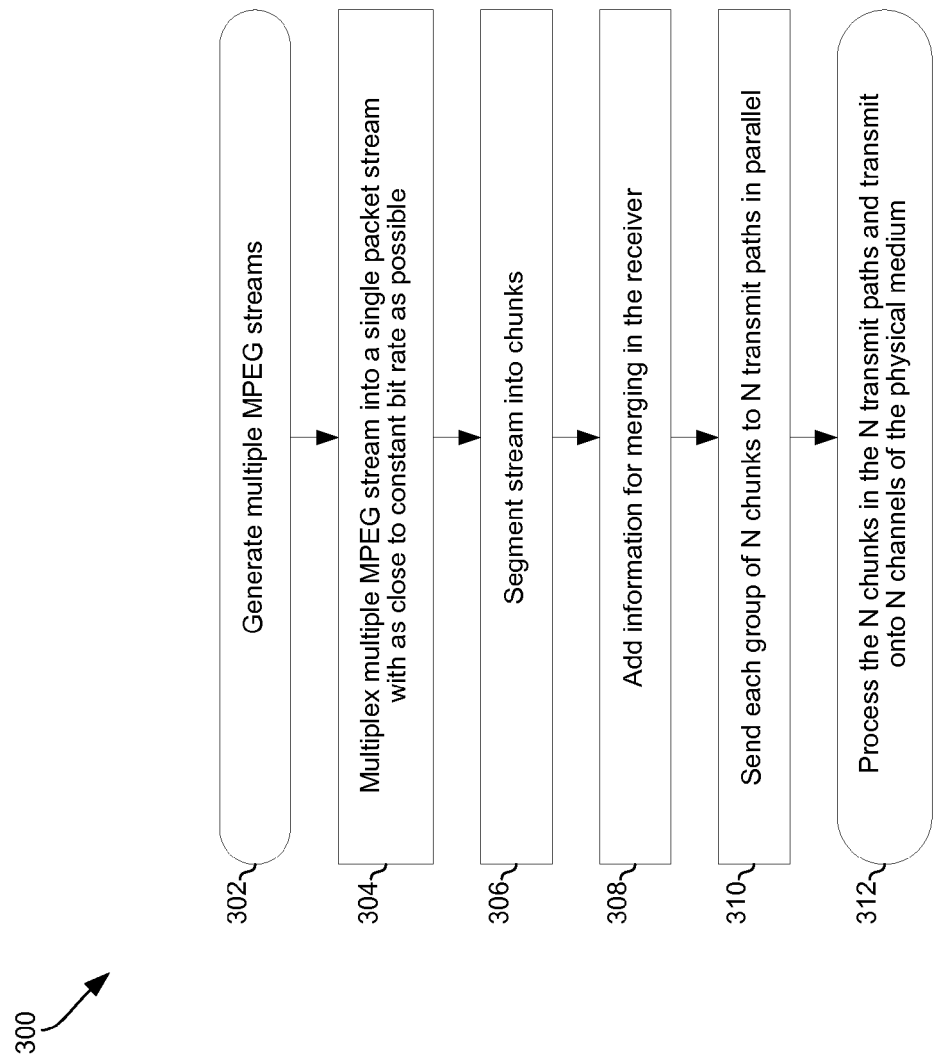
FIG. 3 depicts a flowchart of an example process for transmission of ultra-high definition video.

FIG. 3 depicts a flowchart of an example process for transmission of ultra-high definition video. Shown in FIG. 3 is flow chart 300, comprising a plurality of example steps (represented as blocks 302-312), which may be performed in a suitable system (e.g., transmitter 100 of FIG. 1A) to facilitate transmission of ultra-high definition (UHD) video.

In step 302, multiple ultra-high definition (UHD) video streams (e.g., MPEG steams) may be generated (e.g., by encoder circuits $102_1$-$102_K$ of the transmitter 100).

In step 304, the multiple UHD video (MPEG) streams may be combined (e.g., multiplexed, via the multiplexer circuit 104 for example) into a single stream (e.g., the packet stream 105), with the goal of achieving a constant bit rate.

In step 306, the single stream (e.g., the packet stream 105) may be segmented (e.g., via the segmenting circuit 106). For example, the single stream may be segmented into chunks of a particular number (e.g., M) of packets each.

In step 308, additional information may be inserted into the chunks, such as information that enables a receiver to merge the chunks to recover the stream 105. For example, a chunk header 152 may be added to each of the chunks. Further, to guard against losing a whole chunk of packets as a result of a lost or corrupted chunk header, other information may also be added into the stream—e.g., redundant information may be inserted into null packets of one or more of the chunks.

In step 310, each group of a particular number (e.g., N) of chunks is distributed among N transmit paths. For example, each transmit path may comprise a modulation component (e.g., modulator circuit $108_i$) and a front-end component (e.g., analog/RF front-end circuit $110_i$). Distributing the chunks into and use of the multiple transmit paths, may allow for transmitting of the N chunks in parallel.

In step 312, each of the N chunks may be processed by a respective one of the N transmit paths and sent onto a respective one of N channels of the physical medium 112.

Figure 4:
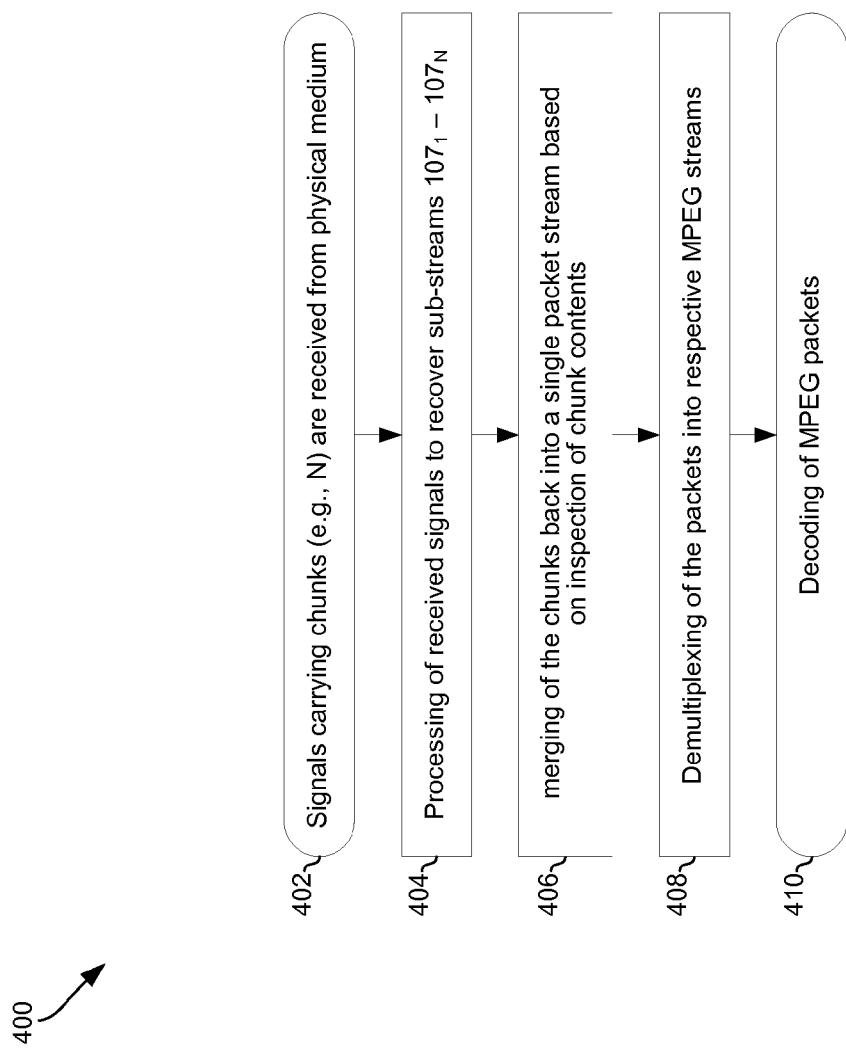
FIG. 4 depicts a flowchart of an example process for reception of ultra-high definition video.

FIG. 4 depicts a flowchart of an example process for reception of ultra-high definition video. Shown in FIG. 4 is flow chart 400, comprising a plurality of example steps (represented as blocks 402-410), which may be performed in a suitable system (e.g., receiver 200 of FIG. 2) to facilitate reception of ultra-high definition (UHD) video.

In step 402, signals carrying a number (e.g., N) of chunks of MPEG packets are received via a physical medium (e.g., via corresponding N channels of the physical medium 112 physical medium 112).

In step 404, the received chunks are processed, via a corresponding number (e.g., N) of receive paths. For example, each receiver path may comprise a front-end component (e.g., analog/RF front-end circuit 210) and a demodulation component (e.g., demodulator circuit $208_i$). The processing performed via the receiver paths may enable recovery of a plurality of sub-streams (e.g., sub-streams $107_1$-$107_N$) corresponding to (or originally embedded, at the transmitter-side) the received chunks.

In step 406, the sub-streams $107_1$-$107_N$ may be processed (e.g., by the desegmenting circuit 206) to merge (de-segment) the chunks back into the original stream (e.g., the packet stream 105). The merging may use information included in the received chunks (e.g., in the chunk headers 152 and/or information in null packets of the chunks), such as when the chunk headers were lost or corrupted, for example.

In step 408, the merged stream (e.g., the packet stream 105) may be processed (e.g., demultiplexed, via the demultiplexer circuit 204 for example) to enable extracting the multiple encoded video streams (e.g., MPEG streams $103_1$-$103_K$) that originally had been combined, at the transmitter-side, into (to form) the merged stream.

In step 410, the encoded video streams (e.g., MPEG streams $103_1$-$103_K$) may be decoded (e.g., via the decoder circuits $202_1$-$202_K$) to enable extracting (obtaining) the ultra-high definition video.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
one or more circuits for use in transmitting ultra-high definition (UHD) video, the one or more circuits being operable to:
generate a single packet stream based on a plurality of encoded ultra-high definition (UHD) video streams, wherein the single packet stream comprises packets corresponding to the plurality of encoded ultra-high definition (UHD) video streams;
split the single packet stream into a plurality of sub-streams, wherein each one of the plurality of sub-steams comprises one or more packets from the single packet stream
concurrently process the plurality of sub-streams, via a plurality of transmit paths, to generate a corresponding plurality of signals for transmission over a particular physical medium, wherein
each one of the plurality of sub-streams is processed via a respective one of the plurality of transmit paths, to generate a signal corresponding to said each one of the plurality of sub-streams; and
insert headers into the plurality of sub-steams, wherein the inserting of headers comprises inserting a header corresponding to a packet in a first one of the plurality of sub-streams into at least a second one of the plurality of sub-steams.

2. The system of claim 1, wherein the one or more circuits are operable to concurrently transmit each of the plurality of signals, generated based on processing of the plurality of sub-streams, via a respective communication channel in the physical medium.

3. The system of claim 1, wherein the one or more circuits are operable to generate the single packet stream such that it has a constant bit rate.

4. The system of claim 1, wherein the one or more circuits are operable to insert into the single packet stream one or more null packets.

5. The system of claim 1, wherein the one or more circuits are operable to configure and/or adjust generating and/or processing the plurality of sub-streams based on quality of communication.

6. The system of claim 1, wherein the one or more circuits are operable to monitor performance during transmission of the ultra-high definition (UHD) video.

7. The system of claim 6, wherein the one or more circuits are operable to control, based on the monitoring of performance, one or more of the generating of the single packet stream, and the generating and/or processing of the plurality of sub-streams.

8. The system of claim 1, wherein the one or more circuits are operable to split the single packet stream into the plurality of sub-streams by:
grouping packets corresponding to the packet stream into a plurality of chunks, and
appending to each of the plurality of chunks a corresponding chunk header that comprises information that is used during reconstructing the packet stream at the receiver-side.

9. A method comprising:
in an electronic system:
generating a single packet stream based on a plurality of encoded ultra-high definition (UHD) video streams, wherein the single packet stream comprises packets corresponding to the plurality of encoded ultra-high definition (UHD) video streams;

splitting the single packet stream into a plurality of sub-streams, wherein each one of the plurality of sub-steams comprises one or more packets from the single packet stream; and concurrently processing the plurality of sub-streams, via a plurality of transmit paths, to generate a corresponding plurality of signals for transmission over a particular physical medium, wherein each one of the plurality of sub-streams is processed via a respective one of the plurality of transmit paths, to generate a signal corresponding to said each one of the plurality of sub-streams; and inserting headers into the plurality of sub-steams, wherein the inserting of headers comprises inserting a header corresponding to a packet in a first one of the plurality of sub-streams into at least a second one of the plurality of sub-steams.

10. The method of claim 9, comprising concurrently transmitting each of the plurality of signals, generated based on processing of the plurality of sub-streams, via a respective communication channel in the physical medium.

11. The method of claim 9, comprising generating the single packet stream such that it has a constant bit rate.

12. The method of claim 9, comprising inserting into the single packet stream one or more null packets.

13. The method of claim 9, comprising configuring and/or adjusting generating and/or processing the plurality of sub-streams based on quality of communication.

14. The method of claim 9, comprising monitoring performance during transmission of the ultra-high definition (UHD) video.

15. The system of claim 14, comprising controlling, based on the monitoring of performance, one or more of the generating of the single packet stream, and the generating and/or processing of the plurality of sub-streams.

16. The method of claim 9, wherein splitting the single packet stream into the plurality of sub-streams comprises:

grouping packets corresponding to the packet stream into a plurality of chunks, and appending to each of the plurality of chunks a corresponding chunk header that comprises information that is used during reconstructing the packet stream at the receiver-side.

17. A system comprising:

one or more circuits for use in receiving ultra-high definition (UHD) video, the one or more circuits being operable to:

concurrently receive and process, via a plurality of receive paths, a plurality of signals communicated over a corresponding plurality of channels in a physical medium;

reconstruct based on processing of the plurality signals, a plurality of sub-streams comprising a plurality of packets carrying encoded ultra-high definition (UHD) video; wherein:

the reconstructing of the plurality of sub-streams is based on information obtained from headers into the plurality of sub-streams at receiver-side; and reconstructing at least one of the plurality of sub-streams is based on header corresponding to a packet in the at least one of the plurality of sub-streams that is inserted into at least another one of the plurality of sub-steams;

combine the plurality of sub-streams into a single packet stream; and extracting from the single packet steams a plurality of encoded ultra-high definition (UHD) video streams.

18. The system of claim 17, wherein the one or more circuits are operable to obtain handling related information from the plurality of signals, the plurality of sub-streams, and/or the single packet stream.

19. The system of claim 18, wherein the handling related information is embedded and/or inserted at the transmitter-side.

20. The system of claim 18, wherein the one or more circuits are operable to control and/or adjust, based on the obtained handling information, reconstructing of the plurality of sub-streams, combining of the plurality of sub-stream into the single packet stream, and/or handling of the single packet stream.

* * * * *